United States Patent [19]

Rongley

[11] 4,286,894  
[45] Sep. 1, 1981

[54] TOLERANCE RINGS

[75] Inventor: Raymond A. Rongley, Newtown, Pa.

[73] Assignee: Roller Bearing Company of America, West Trenton, N.J.

[21] Appl. No.: 22,448

[22] Filed: Mar. 21, 1979

[51] Int. Cl.³ .............................................. F16D 1/06
[52] U.S. Cl. ..................................... 403/372; 308/236
[58] Field of Search ............... 403/372, 365, 357, 138, 403/371; 308/236, 184 R; 277/160, 161, 159

[56] References Cited

U.S. PATENT DOCUMENTS

| | | | |
|---|---|---|---|
| 1,662,544 | 3/1928 | Solenberger | 277/160 |
| 2,897,026 | 7/1959 | Haller et al. | 308/236 X |
| 2,931,412 | 4/1960 | Wing | 403/239 X |
| 3,061,386 | 10/1962 | Dix et al. | 308/184 |
| 3,142,887 | 8/1964 | Hulck | 29/148.4 |
| 3,145,547 | 8/1974 | Lyons | 308/236 X |
| 3,700,271 | 10/1972 | Blaurock et al. | 403/372 |
| 3,838,928 | 10/1974 | Blaurock et al. | 403/372 |

FOREIGN PATENT DOCUMENTS 238798  9/1911 Fed. Rep. of Germany ........... 277/161
1372974 11/1974 United Kingdom ..................... 403/138

*Primary Examiner*—Andrew V. Kundrat
*Attorney, Agent, or Firm*—Zachary T. Wobensmith, II; Zachary T. Wobensmith, III

[57] ABSTRACT

A tolerance ring is provided having a plurality of corrugations of different heights to provide different available spring rates even if one or more of the corrugations of one height is crushed. The corrugations of different heights can be in a single row or in a plurality of rows.

6 Claims, 11 Drawing Figures

TOLERANCE RINGS

BACKGROUND OF THE INVENTION

1. Field of the Invention

This invention relates to tolerance rings.

2. Description of the Prior Art

It has heretofore been proposed as shown in the U.S. Patent to Dix et al., U.S. Pat. No. 3,061,386 to provide a tolerance ring of resilient metal for seating a shaft or round rod in a receiving opening, the tolerance ring having a plurality of circumferentially arranged corrugations of uniform height and pitch, the U.S. Patent to Hulck et al., U.S. Pat. No. 3,142,887 showing the method of making such a tolerance ring.

Blaurock et al., in U.S. Pat. No. 3,700,277, show a tolerance ring of resilient metal having a plurality of rows of corrugations of the same height with the rows having corrugations both aligned and offset with respect to each other.

Blaurock et al., in U.S. Pat. No. 3,838,928 show parallel juxtaposed separated circumferential rows of alternating, trough shaped recesses and integral projections in each major face, the recesses in each face corresponding to aligned projections in the other face, the projections and recesses all being of uniform heights in opposite directions with respect to the strip on which they are formed.

It is well known that a tolerance ring with a uniform corrugation has a linear spring rate, that is the spring force increases in a linear fashion with an increase in compression. The amount of compression a tolerance ring with uniform corrugations pitch and height can withstand before exceeding its elastic limit and acquiring a permanent deformation is an average of 15% of the corrugation height. When stressed beyond its elastic limit a tolerance ring fails to function accurately.

The tolerance rings of the present invention permit of a larger range of tolerances than the tolerance rings heretofore available.

The structures presently available for slip fit, press fit or mountings with an interposed resilient or spring member for mounting roller bearings are frequently unsatisfactory because the bearing is clamped so tightly that movement cannot occur or even if axial movement is possible the radial load capacity is low or rotational movement of the race is not prevented. The tolerance ring of the present invention with a multiple spring rate can perform these necessary functions very economically and in a manner not heretofore available.

SUMMARY OF THE INVENTION

In accordance with the invention a tolerance ring is provided having a plurality of corrugations of different heights, in one row or in a plurality of rows, thereby accommodating larger tolerances than tolerance rings heretofore available, as well as making available variations in spring rates to meet different application requirements, while also providing a structure which upon crushing of corrugations of greater height will still have remaining corrugations which permit of reassembly and continued use without the necessity for replacement of the tolerance rings.

The tolerance ring of the present invention has an additional advantage in that axial movement between parts, to adjust for thermal expansion and contraction, in electric motors and other devices, is accommodated.

It is the principal object of the invention to provide a tolerance ring capable of providing multiple spring rates and accommodate a wider range of tolerances between parts to be connected than heretofore.

It is a further object of the invention to provide a tolerance ring having a plurality of corrugations of different heights, in a single row or in different rows, thereby to accommodate a larger range of tolerances than the tolerance rings heretofore available.

It is a further object of the invention to provide a tolerance ring with multiple corrugations affording different spring rates so that the highest corrugations can permit of axial movement but prevent relative rotation with lower height corrugations.

It is a further object of the invention to provide a tolerance ring having a plurality of corrugations of different heights so that upon the elastic limit of higher corrugations being exceeded, additional corrugations are available to exert their spring forces.

It is a further object of the invention to provide a tolerance ring having a plurality of different heights of corrugations so that upon the elastic limit of higher corrugations being exceeded additional corrugations are available to exert their spring forces so that reassembly and continued use of the tolerance ring is available without the necessity for replacement of the tolerance ring.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF PREFERRED EMBODIMENTS

Figure 1:
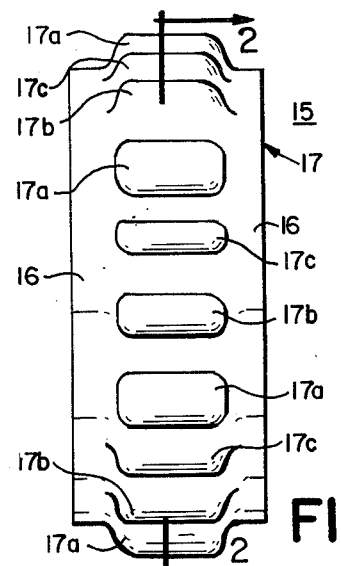
FIG. 1 is a view in elevation of a tolerance ring in accordance with the invention having a single row of corrugations of different heights.
Figure 2:
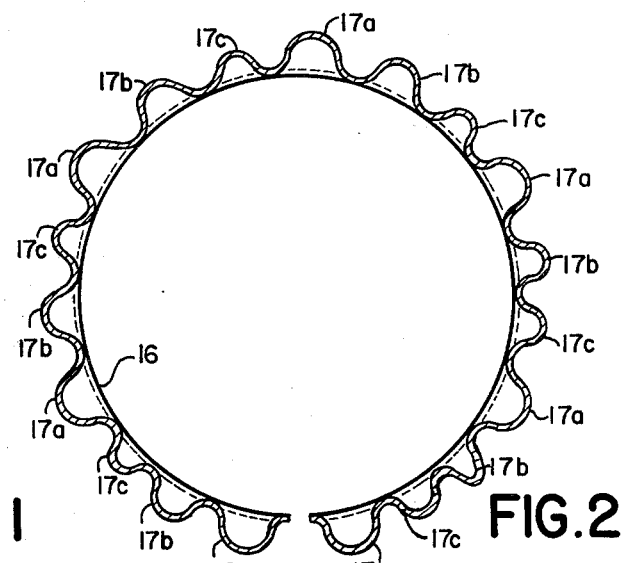
FIG. 2 is a vertical transverse sectional view taken approximately on the line 2—2 of FIG. 1.

Referring now more particularly to the drawings, in which preferred embodiments of the invention are illustrated FIGS. 1 and 2 show one form of the invention.

The tolerance ring 15 is made of a metal strip of suitable resilience with side rims 16 and a row of circumferentially disposed spaced corrugations 17 struck or formed therebetween. The corrugations 17, as shown in detail in FIG. 2, are of different heights with respect to the rims 16. As shown in FIG. 2, the corrugations 17 include a higher corrugation 17a, a corrugation 17b of intermediate height and a lower corrugation 17c. The shapes and pitch of the corrugations 17 may also be varied to provide the desired spring action.

Figure 3:
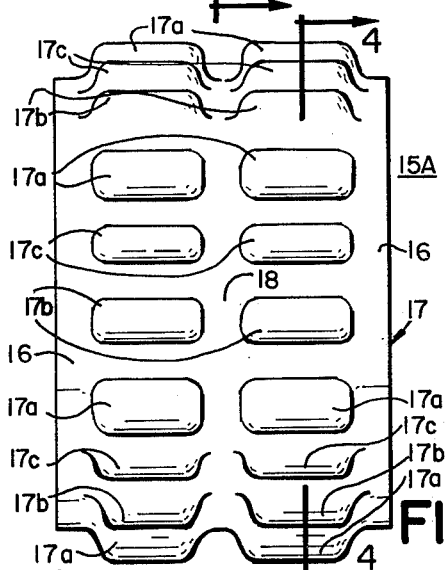
FIG. 3 is a side elevational view of another tolerance ring in accordance with the invention and having a plurality of rows of corrugations similar to those of FIG. 1.
Figure 4:
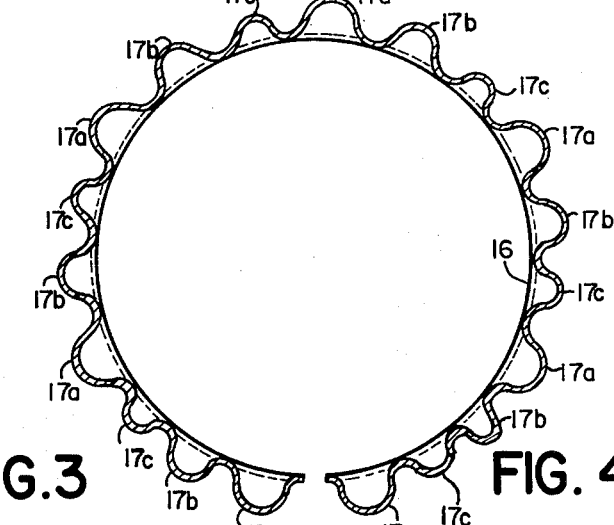
FIG. 4 is a vertical sectional view taken approximately on the line 4—4 of FIG. 3.

In FIGS. 3 and 4, the tolerance ring 15A, in place of a single row of corrugations 17a, 17b and 17c, has multiple rows of corrugations 17a, 17b and 17c between the rims 16, separated by a circumferential spacer 18.

Figure 5:
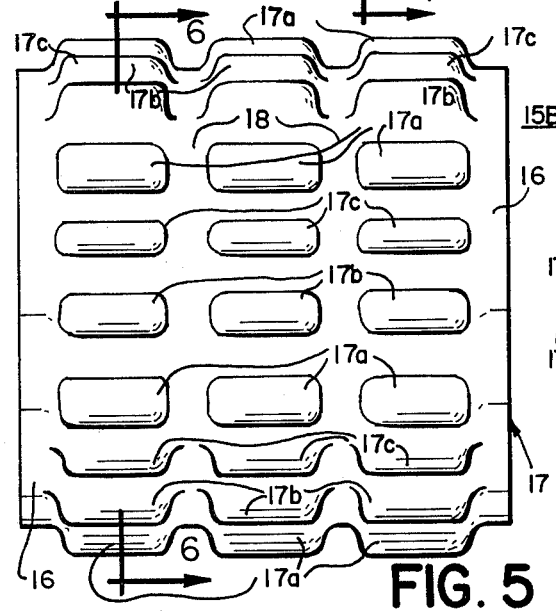
FIG. 5 is a side elevational view of another tolerance ring in accordance with the invention, similar to FIG. 3 but with an additional row of corrugations.
Figure 6:
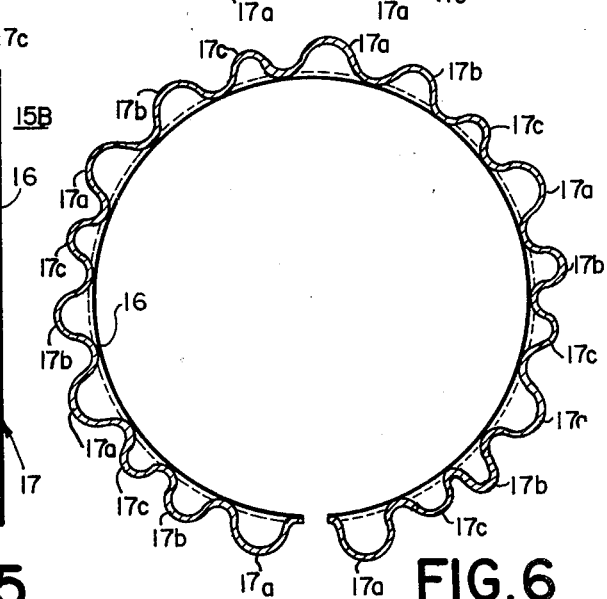
FIG. 6 is a vertical sectional view taken approximately on the line 6—6 of FIG. 5.

In FIGS. 5 and 6, the tolerance ring 15B in place of a single row of corrugations 17a, 17b and 17c, has three rows of corrugations 17a, 17b and 17c, between the rims 16, separated by two circumferential spacers 18.

Figure 7:
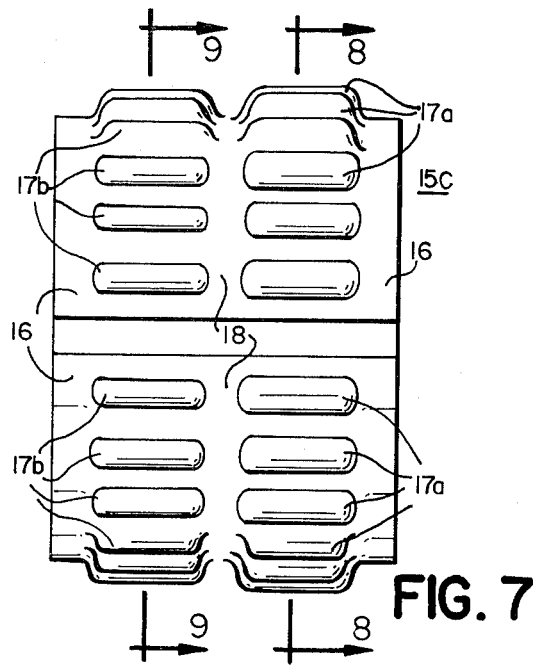
FIG. 7 is a side elevational view of another tolerance ring in accordance with the invention and having two rows of corrugations of different heights.
Figure 9:
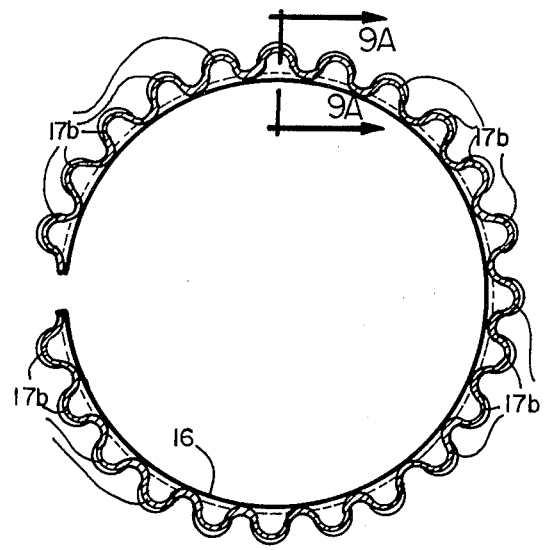
FIG. 9 is a vertical sectional view taken approximately on the line 9—9 of FIG. 7.
Figure 9A:
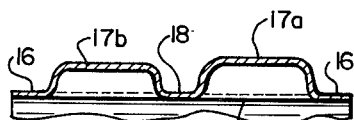
FIG. 9A is a fragmentary sectional view taken approximately on the line 9A—9A of FIG. 9.
Figure 8:
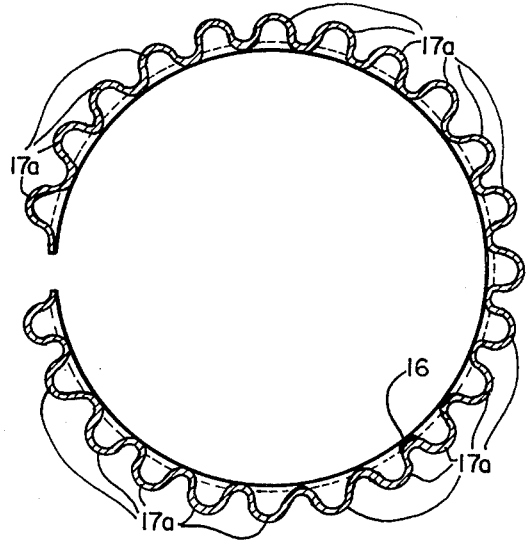
FIG. 8 is a vertical sectional view taken approximately on the line 8—8 of FIG. 7.

In FIGS. 7, 8 and 9, the tolerance ring 15C has a different arrangement of rows of corrugations, with a row of higher corrugations 17a and a row of lower height corrugations 17b.

Figure 10:
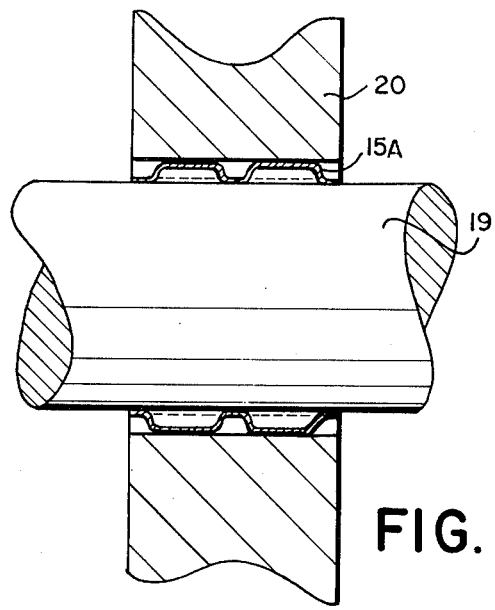
FIG. 10 is a fragmentary vertical sectional view showing the tolerance ring of FIG. 3 interposed between a shaft and a member carried on the shaft.

In FIG. 10, to illustrate one mode of use a ring 15A is shown interposed between a shaft 20 and a member 21 carried thereon.

While the tolerance rings 15, 15A, 15B and 15C are shown as having their corrugations 17a, 17b and 17c of sinusoidal shape the cross section can be varied as desired to provide a different spring rate upon compression, and including steeply to have relatively flat spots or to have very low total rates with very steep increases. The pitch or spacing between corrugations 17 may also be varied to obtain the desired spring action.

The tolerance ring is inserted in the hollow circular cylindrical space between the two parts at the place of use. The action of the tolerance ring will be dependent upon the clearance between the two parts. It may be that the higher corrugations will suffice to supply the spring action desired. If the clearance space is such that the outer corrugations 17a are crushed and their elastic limit exceeded then the remaining corrugations 17b therebelow will supply the desired spring action and maintain accurate positioning.

In a similar manner, if the corrugations 17b are crushed the corrugations 17c will still be available to apply a retaining spring force.

With a set of corrugations of lower than the maximum height available to provide a new tolerance the resilience of that set of corrugations will provide the desired spring force for retention. The parts can be separated and reassembled with an accurate consistent press assembly provided.

I claim:

1. A tolerance ring for positioning between two radially spaced annular surfaces comprising
   a metallic strip of resilient sheet metal of split ring shape having cylindrical side rims and a plurality of individual resilient corrugations extending from said strip and uniformly spaced around the periphery of the strip,
   said corrugations being positioned intermediate said rims and spaced from each other,
   the corrugations being of a plurality of heights of different dimensions whereby successively different radial spring actions are exerted upon force application on the corrugations in any individual direction, the corrugations of any specific height providing identical multiple spring actions when positioned between said radially spaced annular surfaces.

2. A tolerance ring as defined in claim 1 in which a row of such corrugations is provided.

3. A tolerance ring as defined in claim 1 in which a plurality of rows of such corrugations is provided.

4. A tolerance ring as defined in claim 1 in which said corrugations are of at least two different heights.

5. A tolerance ring as defined in claim 1 in which said corrugations are of three different heights.

6. A tolerance ring for positioning between two radially spaced annular surfaces comprising
   a metallic strip of resilient sheet metal of ring shape having a pair of cylindrical side rims and a central cylindrical portion,
   a first row of individual resilient corrugations of a predetermined height uniformly spaced around said strip and disposed between one of said side rims and said central portion,
   a second row of individual resilient corrugations uniformly spaced around said strip of a different predetermined height and disposed between the other of said rims and said central portion,
   said rows of corrugations providing a plurality of spring actions in any individual radial direction and, dependent on the predetermined height, identical multiple spring actions in all directions when positioned between said radially disposed surfaces.

* * * * *